(12) United States Patent
Vanimisetti et al.

(10) Patent No.: US 8,679,680 B2
(45) Date of Patent: Mar. 25, 2014

(54) MITIGATION OF MECHANICAL DEGRADATION IN LITHIUM BATTERY MATERIALS USING BICONCAVE ELECTRODE PARTICLES

(75) Inventors: Sampath K. Vanimisetti, Bangalore (IN); Ramakrishnan Narayanrao, Bangalore (IN)

(73) Assignee: GM Global Technology Operations LLC, Detroit, MI (US)

(*) Notice: Subject to any disclaimer, the term of this patent is extended or adjusted under 35 U.S.C. 154(b) by 207 days.

(21) Appl. No.: 13/152,851

(22) Filed: Jun. 3, 2011

(65) Prior Publication Data

US 2012/0308853 A1     Dec. 6, 2012

(51) Int. Cl.
*H01M 4/58*     (2010.01)

(52) U.S. Cl.
USPC ........................................ 429/218.1; 429/209

(58) Field of Classification Search
None
See application file for complete search history.

(56) References Cited

U.S. PATENT DOCUMENTS

| | | |
|---|---|---|
| 7,018,607 B2 | 3/2006 | Nazri et al. |
| 7,722,994 B2 | 5/2010 | Halalay |
| 7,736,805 B2 | 6/2010 | Nazri et al. |
| 8,101,152 B1 | 1/2012 | Halalay et al. |
| 8,148,455 B2 | 4/2012 | Posudievsky et al. |
| 8,399,138 B2 | 3/2013 | Timmons |
| 8,420,259 B2 | 4/2013 | Xiao et al. |
| 2009/0325071 A1 | 12/2009 | Verbrugge et al. |
| 2010/0068605 A1 | 3/2010 | Harris et al. |
| 2010/0124691 A1 | 5/2010 | Harris |
| 2011/0151333 A1 | 6/2011 | Halalay et al. |
| 2011/0200863 A1 | 8/2011 | Xiao et al. |
| 2011/0236762 A1 | 9/2011 | Huang et al. |
| 2012/0102725 A1 | 5/2012 | Fuller et al. |
| 2012/0244390 A1 | 9/2012 | Cheng et al. |
| 2012/0244418 A1 | 9/2012 | Cheng et al. |
| 2012/0301790 A1 | 11/2012 | Xiao et al. |
| 2013/0004857 A1 | 1/2013 | Kia et al. |
| 2013/0052509 A1 | 2/2013 | Halalay et al. |
| 2013/0099159 A1 | 4/2013 | Halalay et al. |
| 2013/0143076 A1 | 6/2013 | Sachdev |

FOREIGN PATENT DOCUMENTS

| | | | |
|---|---|---|---|
| CN | 102810661 | 12/2012 | |
| DE | 102012209056 | 12/2012 | |
| JP | 2004-111151 | * 4/2004 | ............... H01M 4/58 |

OTHER PUBLICATIONS

The definition of the term "biconcavity", as retrieved by <http://www.credoreference.com/entry/hcengdict/biconcave> on Jun. 25, 2013.*

Machine translation of JP 2004-111151, retrieved frin <http://www19.ipdl.inpit.go.jp/PA1/cgi-bin/PA1DETAIL> on Jun. 25, 2013.*

(Continued)

*Primary Examiner* — Cynthia K. Walls
(74) *Attorney, Agent, or Firm* — Harness, Dickey & Pierce, P.L.C.

(57) ABSTRACT

Methods for decreasing mechanical degradation in a lithium battery are provided. At least a portion of one of the anode or the cathode includes a plurality of biconcave particles. The biconcave particles provide increased surface area for lithium diffusion without increasing the volume of the particles. As the lithium diffuses across the particles, the combination of convergent and divergent diffusion fronts of lithium reduces the stresses and elastic strain energy responsible for mechanical degradation of the electrode while increasing the rate of lithium intake.

20 Claims, 5 Drawing Sheets

(56) References Cited

OTHER PUBLICATIONS

Christensen, Jake. "Modeling Diffusion-Induced Stress in Li-Ion Cells with Porous Electrodes." Journal of The Electrochemical Society (2010), vol. 157, A366-A380.

Iskandar, F., Gradon, L., & Okuyama, K. "Control of the morphology of nanostructured particles prepared by the spray drying of a nanoparticle sol." Journal of Colloid and Interface Science (2003), vol. 235, 296-303.

Lampe-Onnerud, C., Shi, J., Onnerud, P., Chamberlain, R., & Barnett, B. "Benchmark study on high performing carbon anode materials." Journal of Power Sources 97-98 (2001), vol. 97-98, 133-136.

Iskandar, F., Gradon, L., & Okuyama, K., "Control of the morphology of nanostructured particles prepared by the spray drying of a nanoparticle sol," Journal of Colloid and Interface Science (2003), vol. 265, No. 2, pp. 296-303.

* cited by examiner

MITIGATION OF MECHANICAL DEGRADATION IN LITHIUM BATTERY MATERIALS USING BICONCAVE ELECTRODE PARTICLES

FIELD

The present disclosure relates to methods of reducing mechanical degradation in a lithium battery, such as an electrode material of the lithium battery, by incorporating biconcave shaped particles in a portion or entirety of an electrode.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The selection of battery electrode active materials includes considerations such as the desired energy or power output for and any size limitations of the particular device incorporating the battery. With rechargeable batteries, capacity and rate capability, or the quantity as well as the rate at which the battery receives and delivers an electrical charge, are also considered. In electric vehicles or other high-power applications, both the capacity and rate capability are the major priorities because of the extended range and high charge as well as discharge rates demanded by these applications.

With respect to lithium batteries, there is a loss of capacity and rate capability because after the initial charge and discharge cycles of a new battery, there is an "initial cycle irreversibility" or a loss of 5 to 50% of available lithium. Thus, the initial cycle irreversibility decreases the storage and deliverable capacity of the battery for subsequent charges and discharges. This causes a marked decrease in the capacity of subsequent charge and discharge cycles. To compensate for the initial cycle irreversibility and decrease in storage capacity, the battery size may be increased. However, these and other compensations have shortcomings.

In lithium-ion batteries, energy is supplied by a diffusion of lithium ions through the electrolyte from anode to cathode in the battery. During charge and discharge operation, the lithium is intercalated into or from the active electrode material. Because automotive applications have varying energy storage and energy power requirements depending on the type of vehicle, the acceleration, power requirements, and the rate of diffusion or withdrawal of lithium varies during operation of the vehicle. The diffusion of lithium, and in particular the gradients in its concentration thereof, gives rise to diffusion induced stresses in the electrode material. These stresses reportedly damage the electrode material leading to entrapment of lithium responsible for providing the capacity; and reduction in electronic and ionic conductivities which are essential for transporting the active lithium within the electrode material.

SUMMARY

This section provides a general summary of the disclosure, and is not a comprehensive disclosure of its full scope or all of its features.

In various embodiments, the present teachings provide a lithium battery having decreased mechanical degradation after being subjected to diffusion-induced stresses during charge-discharge cycling. The battery includes an anode and a cathode. At least one of the anode and the cathode includes a plurality of biconcave shaped particles.

In still other aspects of the present teachings, methods of mitigating mechanical degradation in a lithium-ion battery are provided. At least one electrode formed of a plurality of biconcave shaped particles is disposed into a battery housing.

In other aspects of the present teachings, methods of mitigating mechanical degradation in a lithium battery are provided. During charging or discharging, lithium diffuses or migrates through a plurality of biconcave shaped particles forming an electrode. In biconcave-shaped particles, the volume is bounded by a combination of convex and concave surfaces that give rise to both converging and diverging diffusion fronts of lithium as it migrates into and out of the active material. The net stresses due to the convergent and divergent diffusion fronts result in lower elastic strain energy stored within each particle and causes less mechanical damage compared to the conventionally used particles that have single surface curvature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical "or." It should be understood that steps within a method may be executed in different order without altering the principles of the present disclosure.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced items. Furthermore, all ranges disclosed herein are inclusive of the endpoints and independently combinable.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

Figure 1:
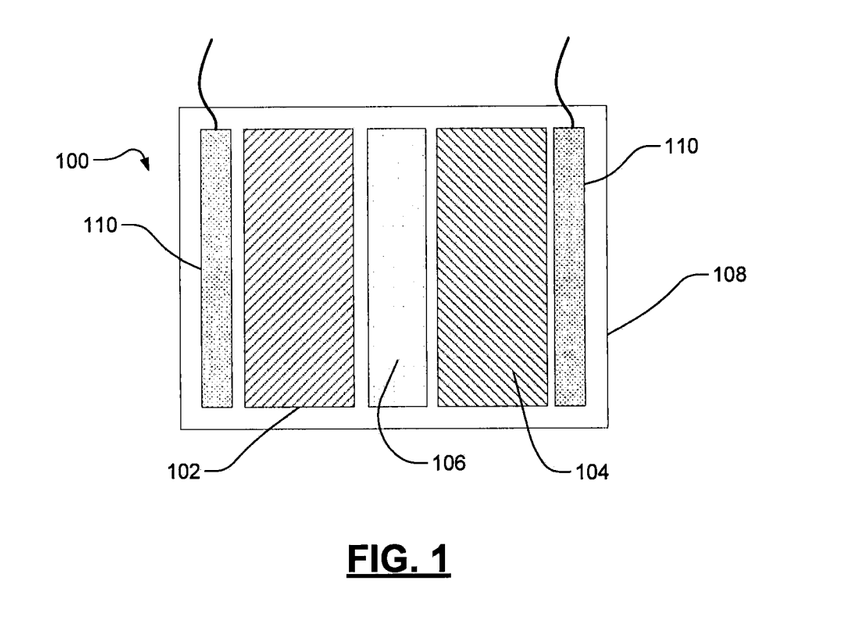
FIG. 1 depicts a battery according to various aspects of the present teachings.

Referring to FIG. 1, the present teachings relate to an electrode for a battery 100. The battery 100 includes the anode 102, a cathode 104, a separator 106, a battery housing 108, and current collectors 110. The battery 100 also includes an electrolyte. When the battery 100 is a lithium-ion system, the electrolyte provides the source and means of transport of lithium ions, whereas the electrodes provide the means for storage of lithium. While the battery 100 of FIG. 1 is a simplified illustration, exemplary battery systems include lithium based batteries, silicon based batteries, lithium-sulfur systems, and lithium-air systems, as non-limiting examples.

To meet the high energy demands of lithium ion systems, there needs to be adequate surface area through which the lithium intercalates into the active electrode material. If the surface area of the electrode is too small, there is inadequate intercalation of the lithium ions which leads to a lower charge and discharge rate. As detailed herein, the present teachings increase the charge and discharge performance for a range of charge and discharge cycles. As a non-limiting example, the range of charge and discharge cycles includes 10, 50, 100, 200, or 1,000 charge and discharge cycles, including all sub-ranges. In still other aspects, the range of charge and discharge cycles is greater than 1,000.

Figure 2:
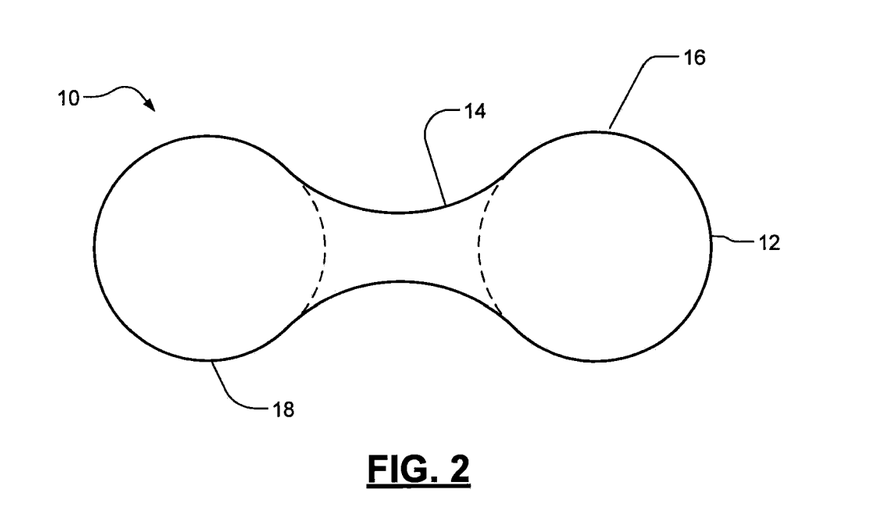
FIG. 2 depicts a biconcave electrode particle according to various embodiments of the present teachings.

FIG. 2 depicts a biconcave particle 10 according to aspects of the present teachings. The biconcave shape provides a large surface area per unit volume. For example, in a biconcave shape having the same volume as a spherical shape or a cylinder, the biconcave shape has a larger surface area than that of the sphere or the cylinder. This large surface area allows electrodes made using the biconcave particles 10 to facilitate similar or higher storage capacity, while operating at a wider range of currents because the enhanced surface area. Notably, this distinguishes the biconcave particles 10 from previously identified shapes, as will be detailed in the Examples section later herein. In addition, the combination of convex and concave surface curvatures in the biconcave shaped particles that give rise to convergent and divergent diffusion fronts of lithium effectively reduce the stress and elastic strain energy ranges compared to those in conventionally shaped particles.

Still further, the operating conditions of the battery 100 mandate stress thresholds for the materials. The maximum specific strain energy during operation of the battery indicates the amount of charge and discharge current that will be tolerated without mechanical degradation. The shape of the biconcave particles 10 reduces the strain energy in the electrodes 102 or 104, thus allowing it to achieve higher concentration and rate of charge (current) of lithium into the electrodes 102 or 104 during an operating condition. Accordingly, the biconcave particles 10 of the present teachings allow batteries to operate at a broader range of currents.

It is believed that the contours of the biconcave particles 10, the increased surface area for lithium diffusion, and the resulting distribution of stress and specific elastic strain energy in the biconcave particles 10 provide a synergy for improved performance and reduced mechanical degradation (including cracking or fragmentation, as non-limiting examples) of active material in electrodes 102 or 104 according to the present teachings. Further, it is believed that the biconcave particles 10 provide better processing characteristics such as being structurally stable, being less likely to break during handling, having a decreased tendency to agglomerate as compared to flaky particles, and also having better packing efficiency than fibrous particles.

Figure 3:
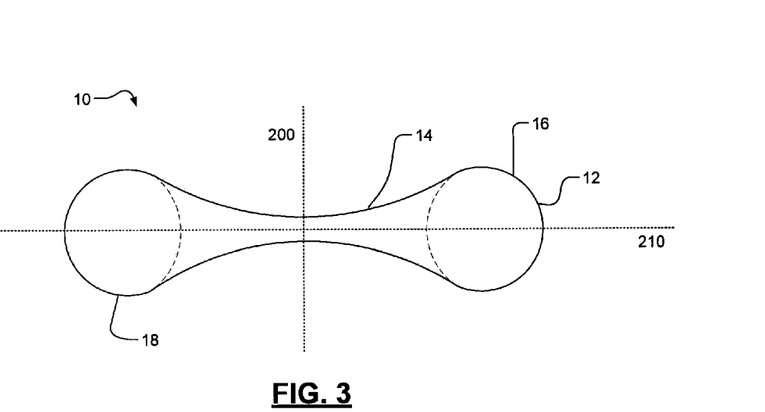
FIG. 3 depicts a cross-section of a biconcave electrode particle according to various embodiments of the present teachings.

The biconcave shaped particles 10 include a toroid-shaped exterior 12 that provides a periphery about a central region 14. The biconcave particle 10 includes an upper surface 16 and a lower surface 18. As best illustrated in FIG. 3, in a cross-sectional view, the upper surface 16 and the lower surface 18 are generally convex at the periphery about the central region 14. However, at the central region 14, the upper surface 16 and the lower surface 18 are generally concave. This combination of concavity and convexity provides the biconcave shaped particle features of the present teachings.

As depicted in FIG. 3, the toroid-shaped exterior 12 is generally circular. It is understood that the toroid-shaped region can also be of another generally convex arcuate shape, such as an ellipse or free-form shape having at least one arcuate feature. In various embodiments, the toroid-shaped exterior 12 has a height at least two-fold greater than the height of the central region 14. In other embodiments, the toroid-shaped exterior 12 has a height that is greater than two-fold and less than ten-fold, including all sub-ranges, than the height of the central region 14. In still other embodiments, the toroid-shaped exterior 12 is three-fold or four-fold thicker than the height of the central region 14 according to the present teachings.

As depicted in FIG. 3, the thickness of the central region 14 varies so that it is smaller at the intersection of the vertical axis 200 and horizontal axis 210 where the upper surface 16 and lower surface 18 are in closest proximity. The central region 14 increases in height along the horizontal axis 210 towards the toroid-shaped exterior 12. The height of the central region 14 may be measured at any point along the central region 14 for the comparison of height to that of the toroid-shaped exterior 12. In various aspects, the height of the central region 14 is taken where it is lowest (as shown at the intersection of the vertical axis 200 and the horizontal axis 201) and compared to the height of the toroid-shaped exterior 12 at its maximum height. When the toroid-shaped exterior 12 is circular, as shown in FIG. 3, the diameter of the circle is used as the maximum height of the toroid-shaped exterior 12. However, in embodiments where the toroid-shaped exterior 12 is elliptical or has another generally arcuate shape, the reference measurement for the toroid-shaped exterior 12 is optionally taken from any point along the elliptical or other generally arcuate shape.

In various embodiments, it is understood that the biconcave particle 10 can include asymmetric features, such as the toroid-shaped exterior having an ellipse on one side and a more circular shape on the other side. The asymmetric features may be due to the formation process or due to an uneven compression of the particles during some point of manufacture or processing. In such embodiments, the relative heights of the toroid-shaped exterior 12 and the central region 14 are calculated for both the more elliptical-shaped side and the more circularly-shaped side, and either measurement is suitable to be used to compare the relative height of the toroid-shaped exterior 12 to the central region 14. It is understood that any shape having a convex surface is suitable for the present teachings, including egg-shapes, ellipses, and the like.

The relative height differences between the central region 14 and the toroid-shaped exterior 12 can be extended along the horizontal axis 210 of the biconcave particle 10. For example, where the biconcave particle 10 has a shorter length along the horizontal axis 210, the rate of height decrease between the toroid-shaped exterior 12 and the central region 14 is sharp, creating a thicker and shorter biconcave particle 10. In various embodiments where the biconcave particle 10 has a longer length with respect to the horizontal axis 210, the rate of height decrease between the toroid-shaped exterior 12 and the central region 14 is more gradual, creating an elongated and thinner biconcave particle. The length of the biconcave particle 10 with respect to the horizontal axis 210 is limited to prevent the biconcave particle 10 from becoming too flattened or disc-like in shape as to minimize the benefits of the biconcave features as detailed herein.

Figure 4:
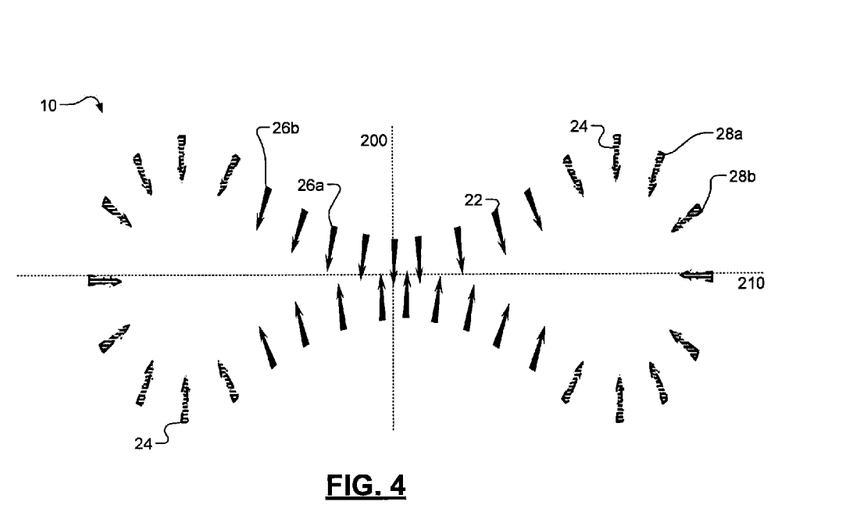
FIG. 4 depicts the direction of the movement of lithium along a combination of converging and diverging diffusion fronts at the convex and concave surfaces that reduce the net elastic strain energy stored within the biconcave electrode particle according to various embodiments of the present teachings.

Turning to FIG. 4, the biconcavity of the particles results in a particular type of lithium diffusion front as will be detailed later. Surprisingly, the biconcave particles 10 of the present teachings exploit the combination of the stress distribution resultant from the diffusion fronts influence by the shape to provide the reduced mechanical degradation, optimized performance, and longevity of the electrodes 102 and/or 104 as detailed herein.

Diffusion of lithium in the biconcave shaped particle occurs across the concave 22 and convex 24 surfaces shown in FIG. 4. The arrows show the direction of diffusion of lithium when the particle is uniformly subjected to a given flux of lithium on its surface, which depends on the charging/discharging condition of the cell. This direction is usually normal to the surface of the particle. The concave surface 22 at the central region of the particle gives rise to a divergent diffusion front as indicated by arrows 26a and 26b. The lithium diffusion fronts from arrows 26a and 26b, also have a shorter distance before the fronts meet than those at the convex surfaces as indicated at arrows 28a and 28b. Since the thickness of the central region is less, it saturates before the toroid region and feeds the lithium to the central core of the toroidal section. This significantly reduces the concentration gradients in the toroidal section. Therefore, the resulting combination of diffusion fronts due to combinations of concave and convex surface not only lead to faster filling up of the particle with lithium but also reduce the stress and elastic strain energy subjected within the particle.

If uncontrolled, certain diffusion stresses cause cracks in the electrode when they cross the materials' threshold. When lithium is being "pushed" into or "pulled" out of the electrodes 102 and 104 at a particular rate (generally in response to power demands of a vehicle for example), there is a gradient in concentration of lithium that results in stresses across the particle. Reportedly, these stresses lead to mechanical degradation, such as fracture or fragmentation of the electrode material, which in turn results in reduced rate capability and performance of the battery 100.

With respect to stresses for the biconcave particles 10 of the present teachings, the biconcave particles 10 provide divergent and convergent diffusion fronts of lithium, depending on the surface curvature of different regions of the biconcave particles 10. The arrows indicated at element 22 represent the divergent diffusion path of the lithium. As used herein, "divergent diffusion" refers to the transmission of lithium towards the interior of the biconcave particle 10, wherein the lithium migrates in a direction away from the lithium flux in the immediately adjacent vicinity.

For example, lithium entering the surface of the biconcave particle 10 along the upper surface 16 at arrow 26a does not intersect with the lithium entering the surface of the biconcave particle 10 in the immediately adjacent vicinity at arrow 26b. The trajectory of arrows 26a and 26b is such that lithium ions following the directions of the respective arrows will not collide and accumulate, but will rather move away from each other or follow divergent paths allowing free flowing of the lithium ions.

Still referencing FIG. 4, the arrows indicated at element 24 represent the convergent diffusion of the lithium. As used herein, "convergent diffusion" refers to the transmission of lithium towards the interior of the biconcave particle 10, wherein the lithium ions migrate in a direction while intersecting with the direction of lithium in the immediately adjacent vicinity. Further, if the converging lithium is not subsequently dispersed, the ions become "clogged" in the particle and prevent additional migration of lithium ions, thus decreasing the performance. For example, a flux of lithium entering the surface of the biconcave particle 10 along the outer surface 16 at arrow 28a and 28b correspond to converging diffusion. The trajectory of arrows 28a and 28b are such that lithium ions following the directions of the respective arrows will meet at a central region 14 of the toroid-shaped exterior 12.

In various aspects of the present teachings, the combination of the converging and diverging diffusion fronts of the lithium that appear in a single biconcave shaped particle is exploited as following. The convergent flux of the lithium as in locations 24, 28a and 28b tends to overcrowd the lithium in the toroidal region of the particles and will result in large concentration gradients and higher stresses. However, the early saturation of the central region 14, due to the divergent lithium flux and smaller thickness or effective diffusion length, supplies lithium to the central region 14 of the toroid. This significantly reduces the concentration gradient within the toroid section and relieves stresses and elastic strain energy in a major volume of the toroid. This means the particle volume can take more of lithium, directly having implications on higher rate capability of the electrode material under given operating conditions. The biconcave particles, as mentioned earlier, can be optimally designed to maximize the charge-discharge rate as well as the aging characteristics. The design features are detailed herein.

In various aspects of the present teachings, the diffusion of lithium ions in the battery 100 is optimized by suitably designing the single shape or collection of shapes of the biconcave electrode particles 10. For example, the relative regions of divergent diffusion and convergent diffusion are adjusted. In one exemplary aspect, a combination of elongated biconcave particles 10 having a central portion that is one-half the height of the toroid-shaped exterior 12 would provide a greater area of divergent diffusion as compared to a shortened biconcave particle having a central portion that is one-fourth the height of the toroid-shaped exterior 12. Notably, the larger the divergent diffusion as compared to the convergent diffusion provides greater reduction in mechanical degradation of the particles 10 and subsequently provides improved performance, optimizes the charge/discharge cyclic capacity, and increases the longevity of the battery 100. By combining different shapes and sizes, one can modify the performance of the battery 100 based on the needs of the particular system.

Still further, the strain energy stored in the biconcave particles 10 is low as compared to other shapes having the same volume, as will be further detailed in the Examples section. In addition, the biconcave nature facilitates an increase in the intercalation rate of lithium during similar operating stress condition of the battery. It is believed that this improves battery capacity while minimizing mechanical degradation and increasing durability and longevity of the battery 100.

Figure 5:
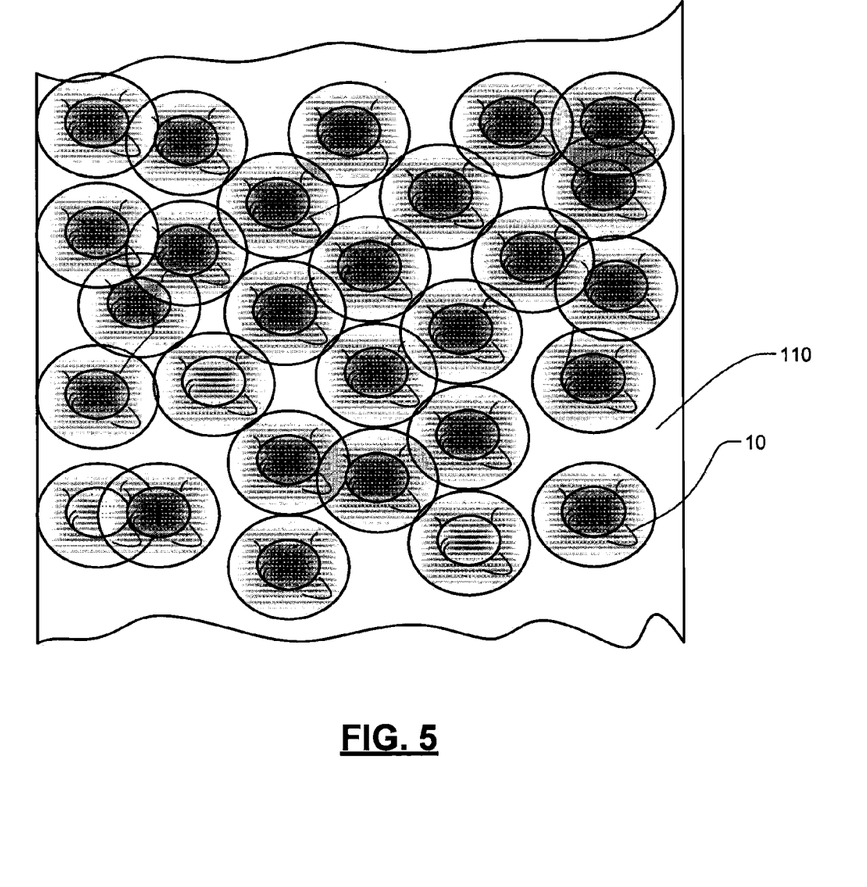
FIG. 5 depicts exemplary biconcave particles fabricated according to methods according to various embodiments of the present teachings.

FIG. 5 depicts biconcave particles 10 having the appropriate toroid-shaped exterior 12 surrounding the central portion 14 of one type of the present teachings. Methods of preparing the biconcave particles are known in the art such as those disclosed by Iskandar et al., in the article "Control of the Morphology of Nanostructured Particles Prepared by the Spray Drying of Nanoparticle Sol" as published in the Journal of Colloid and Interface Science, volume 265, issue 2, which is incorporated herein by reference in its entirety.

As stated above, the biconcave particles 10 combine convergent and divergent diffusion. The combination allows for an efficient migration of lithium into the particles 10. As will be detailed in the Examples section, other shapes fail to provide such efficient migration. Comparatively, electrodes formed using the biconcave particles 10 of the instant teachings significantly reduce or mitigate mechanical degradation in lithium-ion batteries.

The present teachings further provide various methods of implementing the biconcave particles 10. In various aspects, the biconcave particles 10 are used to form a portion of the anode 102 and/or the cathode 104. The biconcave particles 10 are made of any suitable material such as nano-structured materials, including, but not limited to, metal oxides, silicon, tin, and carbonaceous materials. In still other embodiments, the electrode 102 or 104 is formed from a collection of the biconcave particles 10. In such embodiments, the biconcave particles 10 are adhered together using suitable binders. It is understood that selection of the binder systems used for securing the particles is selected as to minimize interference with performance of the battery 100 and to retain the biconcavity of the biconcave particles 10. A single layer of biconcave particles 10, multiple layers of biconcave particle 10, or varying agglomerations or stacks of biconcave particles 10 to form the anode 102 or the cathode 104 are within the scope of the present teachings.

In other aspects, the biconcave particles 10 are secured or embedded to a core 110 as shown in FIG. 5 which is an exploded cutaway view. The core 110 is either the same substrate material as the biconcave particles 10, or it is of a different substrate material. Carbon paper, copper substrates, or a polymeric electrolyte are non-limiting exemplary substrates that are suitable for the core 110 to support the biconcave particles 10. As stated above, any mechanical or binding systems selected to secure the biconcave particles 10 to the core 110 should minimize interference with performance of the battery 100 and retain the biconcavity of the biconcave particles 10.

The amount and location of biconcave particles 10 on the core 110 can be varied along the length of the core 110 or along the front, back, and/or periphery of the core 110 in various combinations. For example, in certain regions, the concentration of biconcave particles 10 can be greater than the concentration at other regions (i.e. discrete strips or blocks of biconcave particles 10 separated by exposed regions of the core 110), or the placement of biconcave particles can be evenly dispersed. In various aspects, a single layer of the biconcave particles 10 is placed on the core 110. In still other aspects, multiple layers of the biconcave particles 10 are placed on the core 110.

As yet another aspect of the present teachings, the biconcave particles 10 are used in combination with particles of a single different shape or multiple different shapes such as the fibers, flakes, nodules, and/or spheres as detailed below. The combination of biconcave particles 10 and other particles are suitable for use to form the entire anode 102 and/or cathode 104, to form a portion of the anode 102 and/or cathode 104, or to cover at least a region of the core 110 or the entire core 110. In such embodiments where a combination of biconcave particles 10 and other shaped particle(s) is used, the biconcave particles 10 are optionally placed in strategic locations. For example, in various aspects, the concentration of biconcave particles 10 is increased near the separator 106 where fragmentation is often observed.

In various methods of the present teachings, methods of mitigating mechanical degradation in a lithium-ion battery are provided. At least one of the anode 102 and the cathode 104 are partly formed with a plurality of biconcave particles 10. The battery 100 is charged with a source of lithium ions by providing an electrolyte containing the lithium source. During the charging or discharging process, the charge transfer reaction occurs on the surface of the electrode and lithium ions react with electrons to form lithium on the surface of the particles. The lithium is then drawn into the biconcave particles 10 by a combination of convergent and divergent diffusion fronts due the geometry of the biconcave particle 10.

The combination of the convergent and divergent diffusion fronts and the early saturation of the thinner central region which supplies lithium to the central core of the toroidal section, reducing the effective concentration gradient in that region, leads to significant reduction in total stress and elastic strain energy. In such embodiments, the net stress from convergent and divergent forces is less than 1%, less than about 10%, less than about 20%, less than about 50%, less than about 70%, or less than about 80%, including all sub-ranges. In various other aspects, the reduction in stresses and elastic strain energy arising due to lithium diffusion across the biconcave particles 10 is from about 10% up to about 98%, including all sub-ranges.

The reduction in stress and elastic strain energy in the system due to the combination of convergent and divergent diffusion fronts provides an increased charge/discharge cyclic stability allowing the biconcave particles 10 to retain up to 99% of their initial capacity over a period of 50 charge cycles or greater. In still other embodiments, the reduction in stress and elastic strain energy in the particles due to the combination of convergent and divergent diffusion fronts allows the biconcave particles 10 to retain from 85% to about 98% of their initial capacity over a period of 50 to 300 charge cycles, including all sub-ranges.

In other aspects of the present teachings, methods of mitigating mechanical degradation in a lithium-ion battery are provided. Lithium is diffused through a plurality of biconcave particles 10 forming the anode 102 or the cathode 104. Within the particles, the lithium is distributed along a divergent path from opposing faces 16 and 18 of the biconcave particles 10. The distribution of the lithium along the divergent path and the convergent path inside the biconcave particle make the maximum strain energy stored in the particle very low as to allow the average concentration of lithium in the biconcave particles 10 during operation to be advantageously exploited to a maximum level as compared to other systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

EXAMPLES

Figure 6:
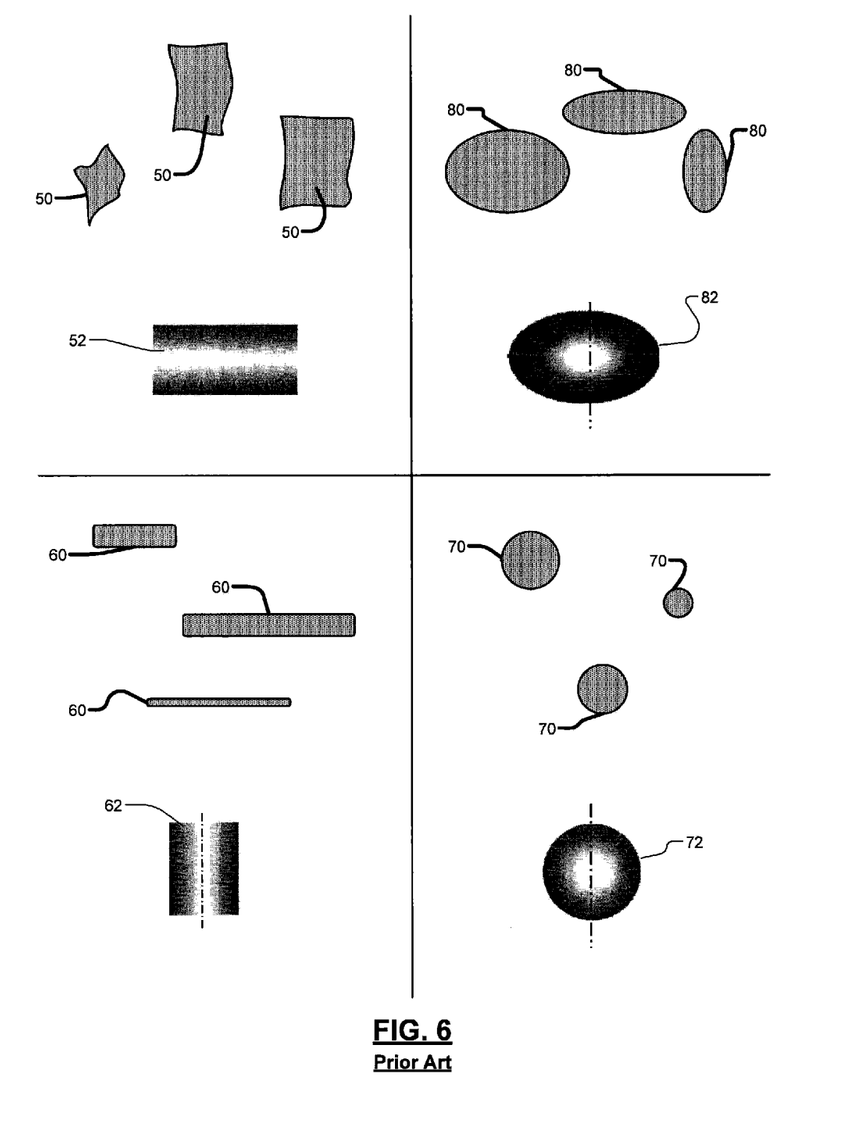
FIG. 6 depicts the movement of lithium along the diffusion fronts at single curvature surfaces that reduce the net elastic strain energy stored within comparative prior art electrode particles.

FIG. 6 depicts prior art particles used in electrodes. Flakes 50 have the parallel convergence profile indicated at element 52. Further, the lithium distributed in such systems follow a parallely opposing path and converge on the mid-plane. Fibers 60 have a cylindrical convergence profile indicated at element 62. The diffusion pressure similarly converges along the axis of the fiber 62, and the lithium ions distributed along the fiber 62 follow a convergent path and collide. Spheres 70 have a spherical convergence profile indicated at element 72. The diffusion pressure similarly converges at the center of the sphere 70, and the lithium distributed along the spheres follow a convergent path and collide. The potato-shape 80 has a convergent diffusion profile as indicated at element 82. In sum, the collisions and accumulated lithium results in large concentration gradients within the particles resulting in high stresses and elastic strain energy that may potentially fracture or fragment the particles, thus decreasing the charge and discharge performance of the electrode Turning to FIG. 7, the normalized strain energy (responsible for the mechanical degradation) 150 and the average concentration (representing the capacity of the particle) 152 are respectively compared for the flakes 50, fibers 60, spheres 70, and the instant biconcave particles 10. The volumes of the respective particles were normalized to provide the following comparative data. Testing included Galvanostatic and Potentiostatic operation of the systems. The following test data reflects information obtained during Galvanostatic operation.

Figure 7:
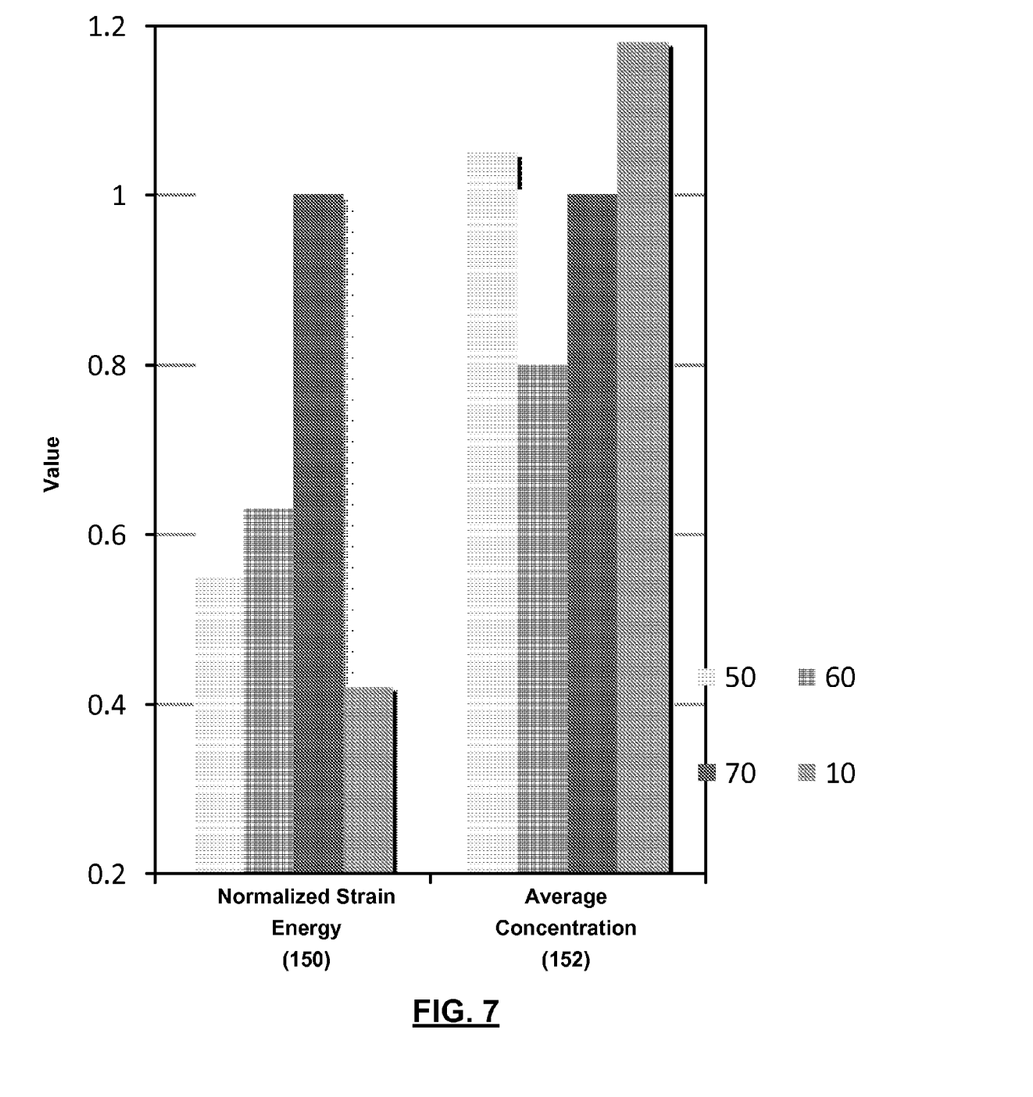
FIG. 7 depicts the improvements to mitigate mechanical degradation and increase in the specific energy storage capacity of the biconcave electrode particles according to various embodiments of the present teachings.

In operation of the test battery systems, the normalized strain energy 150 for the flakes 50 was approximately 0.55, the normalized strain energy for the fibers was approximately 0.65, and the normalized strain energy for the spheres 70 was approximately 1. To the contrary, the normalized strain energy for the biconcave particles 10 of the present teaching was approximately 0.4. This indicates that for volumes that are equal, the biconcave particles 10 have the greatest mitigation of mechanical degradation.

With respect to the average concentration of lithium or capacity 152, the biconcave particles 10 of the present teachings showed a normalized average concentration of nearly 1.2 while the spheres 70 had a normalized average concentration of nearly 1, the flakes 50 had a normalized average concentration of 1.02, and the fibers 60 had a normalized average concentration 0.8. This indicates that for volumes that are equal and experience similar operating conditions, the biconcave particles 10 of the present teachings have the greatest average concentration of lithium at the maximum stress condition. This shows that the biconcave particle can store more lithium before the maximum strain energy during the operating conditions is reached, thereby improving the charge/discharge characteristics.

Still further, the tests indicated several qualitative differences between the shapes that support that the biconcave particles 10 will have improved performance in a battery as compared to particles of other shapes. Notably, the capacity retention for the biconcave particles will be significantly higher in an operating battery as supported by the normalized strain energy data, the normalized average concentration of lithium data, and a linear regression fit of the data.

As combined, the improved average concentration of lithium and the significantly reduced strain energy reflect the synergistic combination of the divergent and convergent flux of lithium, and the increased volumetric specific surface area that are due to the shape of the biconcave particles 10. The other shapes having similar volumes repeatedly and consistently performed less efficiently than the biconcave particles 10 of the instant teachings. It is believed that a reason for the shortcomings of the flakes, for example, is that although it has the large surface area to volume ratio, the solely parallel diffusion front gives rise to stresses and causes the normalized strain energy during operation to be higher.

What is claimed is:

1. A lithium battery comprising:
   an anode; and
   a cathode, wherein at least one of the anode and the cathode comprises a plurality of biconcave particles, wherein each biconcave particle comprises a central region defining two concave sides bound by a toroid-shaped exterior.

2. The lithium battery of claim 1, wherein the biconcave particles provide a combination of a convergent diffusion of lithium providing a converging diffusion flux of lithium and a divergent diffusion of lithium providing a diverging diffusion flux of lithium.

3. The lithium battery of claim 2, wherein the combination of the convergent diffusion flux of lithium and the divergent diffusion flux of lithium results in reduced stress and elastic strain energy.

4. The lithium battery of claim 1, wherein the toroid-shaped exterior has a greater height than a height of the central region.

5. The lithium battery of claim 1, wherein the toroid-shaped exterior has a height that is at least two-fold greater than a height of the central region.

6. The lithium battery of claim 1, wherein the toroid-shaped exterior provides a convergent diffusion of lithium.

7. The lithium battery of claim 1, wherein the central region provides a divergent diffusion of lithium and a faster saturation of lithium thereby reducing a concentration gradient of lithium in the toroid-shaped exterior.

8. The lithium battery of claim 1, wherein the biconcave particles provide a faster rate of lithium storage as compared to a rate of lithium storage of spherical or cylindrical particles having the same volume as the biconcave particles under similar operating conditions.

9. A method of mitigating mechanical degradation in a lithium battery comprising:
   disposing at least one electrode formed of a plurality of biconcave particles into a battery housing, wherein each biconcave particle comprises a central region defining two concave sides bound by a toroid-shaped exterior; and
   charging the at least one electrode with a source of lithium.

10. The method of claim 9, further comprising adhering together the plurality of biconcave particles to form the electrode.

11. The method of claim 9, further comprising adhering together the plurality of biconcave particles about an interior core.

12. The method of claim 9, further comprising diffusing lithium from the source through the biconcave particles.

13. The method of claim 12, further comprising diffusing the lithium along a divergent diffusion front at the central region of the biconcave particles combined with a convergent diffusion at a peripheral region about the central region to reduce a concentration gradient of the lithium.

14. The method of claim 13, wherein the diffusing the lithium along the divergent diffusion front at the central region combined with the convergent diffusion at the peripheral region serves to reduce stress and strain energy in the electrode.

15. The method of claim 9, wherein the electrode is an anode or a cathode.

16. A method of mitigating mechanical degradation in a lithium battery comprising:
   diffusing lithium from a lithium source through a plurality of biconcave particles in an electrode, wherein each biconcave particle comprises a central region defining two concave sides bound by a toroid-shaped exterior; and
   distributing the lithium along a divergent path from opposing faces of the biconcave particles.

17. The method of claim 16, further comprising contacting the electrode with a source of lithium.

18. The method of claim 16, wherein the toroid-shaped exterior has a greater height than the central region.

19. The method of claim 16, wherein the toroid-shaped exterior has a height that is at least two-fold greater than a height of the central region.

20. The method of claim 16, further comprising reducing a concentration gradient in the plurality of biconcave particles.

* * * * *